| LETTER | MORSE CODE REPRESENTATION | BINARY EQUIVALENT $C_1$ | $C_2$ | $C_3$ | $C_4$ | $C_5$ | LETTER | MORSE CODE REPRESENTATION | BINARY EQUIVALENT $C_1$ | $C_2$ | $C_3$ | $C_4$ | $C_5$ |
|---|---|---|---|---|---|---|---|---|---|---|---|---|---|
| A | •— | 0 | 1 | 1 | 0 | 0 | N | —• | 1 | 0 | 1 | 0 | 0 |
| B | —••• | 1 | 0 | 0 | 0 | 1 | O | ——— | 1 | 1 | 1 | 1 | 0 |
| C | —•—• | 1 | 0 | 1 | 0 | 1 | P | •——• | 0 | 1 | 1 | 0 | 1 |
| D | —•• | 1 | 0 | 0 | 1 | 0 | Q | ——•— | 1 | 1 | 0 | 1 | 1 |
| E | • | 0 | 0 | 0 | 0 | 0 | R | •—• | 0 | 1 | 0 | 1 | 0 |
| F | ••—• | 0 | 0 | 1 | 0 | 1 | S | ••• | 0 | 0 | 0 | 1 | 0 |
| G | ——• | 1 | 1 | 0 | 1 | 0 | T | — | 1 | 0 | 0 | 0 | 0 |
| H | •••• | 0 | 0 | 0 | 0 | 1 | U | ••— | 0 | 0 | 1 | 1 | 0 |
| I | •• | 0 | 0 | 1 | 0 | 0 | V | •••— | 0 | 0 | 0 | 1 | 1 |
| J | •——— | 0 | 1 | 1 | 1 | 1 | W | •—— | 0 | 1 | 1 | 1 | 0 |
| K | —•— | 1 | 0 | 1 | 1 | 0 | X | —••— | 1 | 0 | 0 | 1 | 1 |
| L | •—•• | 0 | 1 | 0 | 0 | 1 | Y | —•—— | 1 | 0 | 1 | 1 | 1 |
| M | —— | 1 | 1 | 1 | 0 | 0 | Z | ——•• | 1 | 1 | 0 | 0 | 1 |

INVENTORS.
STANLEY A. FIERSTON
and WALTER GLANTON, JR.
BY Spencer E. Olson
ATTORNEY.

INVENTORS.
STANLEY A. FIERSTON
and WALTER GLANTON, JR.
BY Spencer E. Olson
ATTORNEY.

INVENTORS.
STANLEY A. FIERSTON
and WALTER GLANTON, JR.
BY Spencer E. Olson
ATTORNEY.

INVENTORS.
STANLEY A. FIERSTON
and WALTER GLANTON, JR.
BY Spencer E. Olson
ATTORNEY.

INVENTORS.
STANLEY A. FIERSTON
and WALTER GLANTON, JR.
BY Spencer E. Olson
ATTORNEY.

INVENTORS.
STANLEY A. FIERSTON
and WALTER GLANTOR, JR

BY Spencer E. Olson
ATTORNEY.

3,309,694

CODE CONVERSION APPARATUS

Stanley A. Fierston, Swampscott, and Walter Glanton, Jr., Watertown, Mass., assignors to Sylvania Electric Products Inc., a corporation of Delaware Filed Dec. 30, 1963, Ser. No. 334,412
9 Claims. (Cl. 340—347)

This invention relates generally to code translators and more particularly to an electronic translator for converting a binary code representation of a letter, number or phrase to an audible and/or visible indication of such letter, number or phrase.

A translator of this type has many useful applications, especially in the field of radio navigational aids simulation used in conjunction with ground flight trainers such as described in patent application Ser. No. 317,197, filed Oct. 19, 1963 by S. K. Chao and J. E. Kearns entitled, "Navigation Environment Simulation Trainer," and assigned to the assignee of the present application. In this and similar simulator systems various forms of radio navigational aids are simulated for training pilots and navigators in air traffic control and flight navigation. Included in such systems are: the very high frequency omni-range (VOR); the instrument landing systems (ILS); distance measuring equipment (DME); low frequency AN range; marker beacons; and other similar devices. For identification, the aforementioned systems generally employ transmission of station identification call letters in the form of Morse code which normally consist of one to three letters. In the case of marker beacons, a one letter sequence is usually employed, and in the ILS system the call letter sequence consists of three call letters with the letter I preceding the regular sequence of call letters by six-tenths of a second, the letter I identifying the station as being an ILS station. In simulating such systems it has been found advantageous, and, in fact, almost a necessity, to use digital computers, thereby requiring that information pertaining to such navigational aid stations be stored in the computer and read out when required in the form of an aural or visual indication of the code. The present translator is especially adaptable to any system using a code consisting of sequences of dots and dashes, such as Morse code, and by way of example will be described as a binary-to-Morse code translator.

A known keyer for generating Morse code signals is described in U.S. Patent No. 2,953,642. The keyer therein described has the disadvantage, however, of requiring many moving mechanical parts such as wafer switches and time delay relays. It is further limited to four letters in any sequence. Because of the many mechanical parts required, the keyer is complex in nature and is not readily adaptable to use with a computer controlled simulator.

It is therefore a principal object of this invention to provide a translator for converting a binary code into a suitable aural or visual representation of the code.

Another object of the invention is to provide a translator which is completely electronic in nature.

A more specific object of this invention is to provide a translator for converting a binary code representation of a letter to the Morse code representation of the letter.

Still another object of this invention is to provide a binary-to-Morse code translator capable of generating station identification call letters to identify ILS radio stations.

A further object of the invention is to provide a code translator, utilizing digital techniques and standardized logic circuits, which is readily adaptable for use with a computer controlled simulator system.

Briefly, the invention resides in the recognition that the code representation of a letter can be identified by the use of *m* binary bits wherein the first *n* bits (*n* being less than *m*) of the binary code correspond to the actual code representation of the letter and the remaining *m* minus *n* bits, which are hereinafter referred to as "dummy" bits, determine the number of intelligence bits in the binary code representation of the alphabet letter. For the purpose of describing this invention, the code representation of letters of the alphabet is characterized by a sequence of Morse code characters commonly referred to as dots and dashes. Following the commonly accepted procedure, a dot is represented by a pulse or tone having a duration of one-tenth of a second and a dash is represented by a pulse or tone having a duration of three-tenths of a second. Such sequences will consist of from one to four intelligence characters per letter, where the characters in a letter are separated by a time interval of one-tenth of a second, and a second time interval of two-tenths of a second separates sequences of characters representing successive letters of the word.

In a preferred embodiment, a word is stored in the memory of a computer in five-bit binary form. On command from the computer the binary equivalent of the first letter of the word to be translated is read into the input buffer of the code translator. The computer then strobes the translator and the binary data is converted to the proper electrical signals which are, in turn, used to key an audio generator to produce the audible Morse code representation of the given letter. When the last character of the binary equivalent of the letter has been translated, a signal is generated in the translator which resets the input buffer and indicates to the computer that the next letter of the word is to be sent to the translator, whereupon the process is repeated. In addition, a modification of the preferred embodiment is easily made to allow the generation of the station identification call letters of an ILS radio station.

To illustrate a preferred embodiment of the invention, it will be described in connection with the translation from binary to Morse code of the station identification call letters BOS, which represent the identification code of an Instrument Landing System radio station. As indicated above, the call letter is preceded by the letter I, identifying the station as being an ILS station.

The foregoing and other objects, features and advantages of the invention, and a better understanding of its construction and operation, will become apparent from the following detailed description taken in conjunction with the accompanying drawings, in which.

Figures 1, 2:
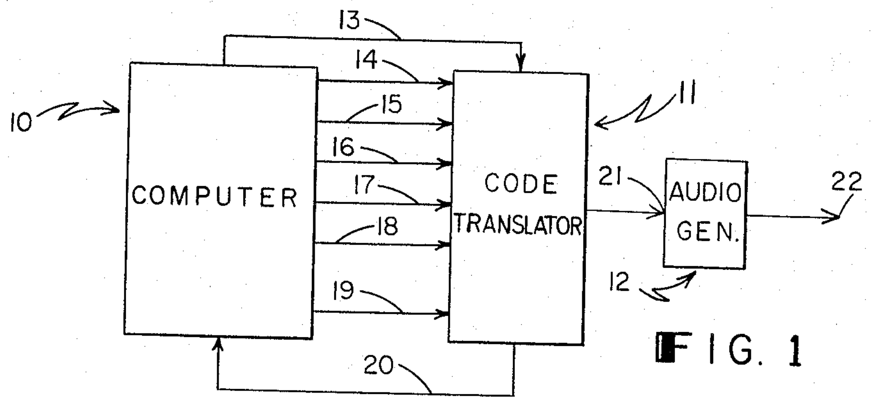
FIG. 1 is a block diagram of a computer, the code translator of the invention, and an audio tone generator.
FIG. 2 is a table of the Morse code representation and the digital representation of the letters of the alphabet.

Referring now to FIG. 1, the binary code representation of the word or message to be translated is stored in the computer 10. When the command is received to translate the word into Morse code, the binary representation of the first letter of the word is transferred to the code translator 11 on lines 14, 15, 16, 17 and 18, and, in the special case when the system is used to identify an ILS radio station, line 19 also contains a bit of information. Next, a strobe pulse is sent via line 13 to activate the translator and to cause the first letter of the word to be translated into the appropriate pulse levels and pulse widths such that the signal appearing at output line 21 keys an audio generator 12 to produce an output at 22 which is the proper Morse code aural representation of the letter. When the first letter of the word has been translated, the translator sends a "ready" pulse to the computer via line 20 and the second letter of the word is transferred to the translator. This process is repeated until all of the letters of the word have been translated to Morse code.

Referring next to FIG. 2, for the purpose of this description the five bits of the binary code representation of a letter are denoted by $C_1$, $C_2$, $C_3$, $C_4$ and $C_5$. Following the standard logic notation, an unprimed letter is equivalent to a binary "1" and a primed letter is equivalent to a binary "0." Therefore the binary representation of the letter B, which is 10001, is identified as $C_1,C_2'C_3'C_4'C_5$; and for the letter U, the binary 0110 is equivalent $C_1'C_2'C_3C_4C_5'$. Of the five information bits in the binary representation of a letter, one, two, three or four of these bits are information bits depending on the number of dots and dashes in the Morse code equivalent of the letter. In the translator a "0" information bit is translated into a dot, and a "1" information bit is translated into a dash. The remaining non-information or "dummy" bits are used to identify the number of information bits in the binary representation of the number. To accomplish this, the following identification is used. If $C_5$ is a "1," there are four information bits in the binary representation of the letter; if $C_5$ is a "0" and $C_4$ is a "1," i.e., $C_4C_5'$, there are three information bits in the binary representation of the letter; if $C_5$ and $C_4$ are "0" and $C_3$ and is "1," i.e., $C_3C_4',C_5'$, there are two information bits in the binary representation of the letter; and if $C_5$, $C_4$, $C_3$ and $C_1$ are "0," i.e., $C_2'C_3'C_4'C_5'$, there is one information bit in the binary representation of the letter. For example, in the letter U, $C_5$ is "0" and $C_4$ is "1" and the binary representation of the letter is identified as having three information bits, that is $C_1'C_2'C_3$ or 001, which is to be translated to dot-dash-dash, the Morse code equivalent of the letter U.

Figure 3:
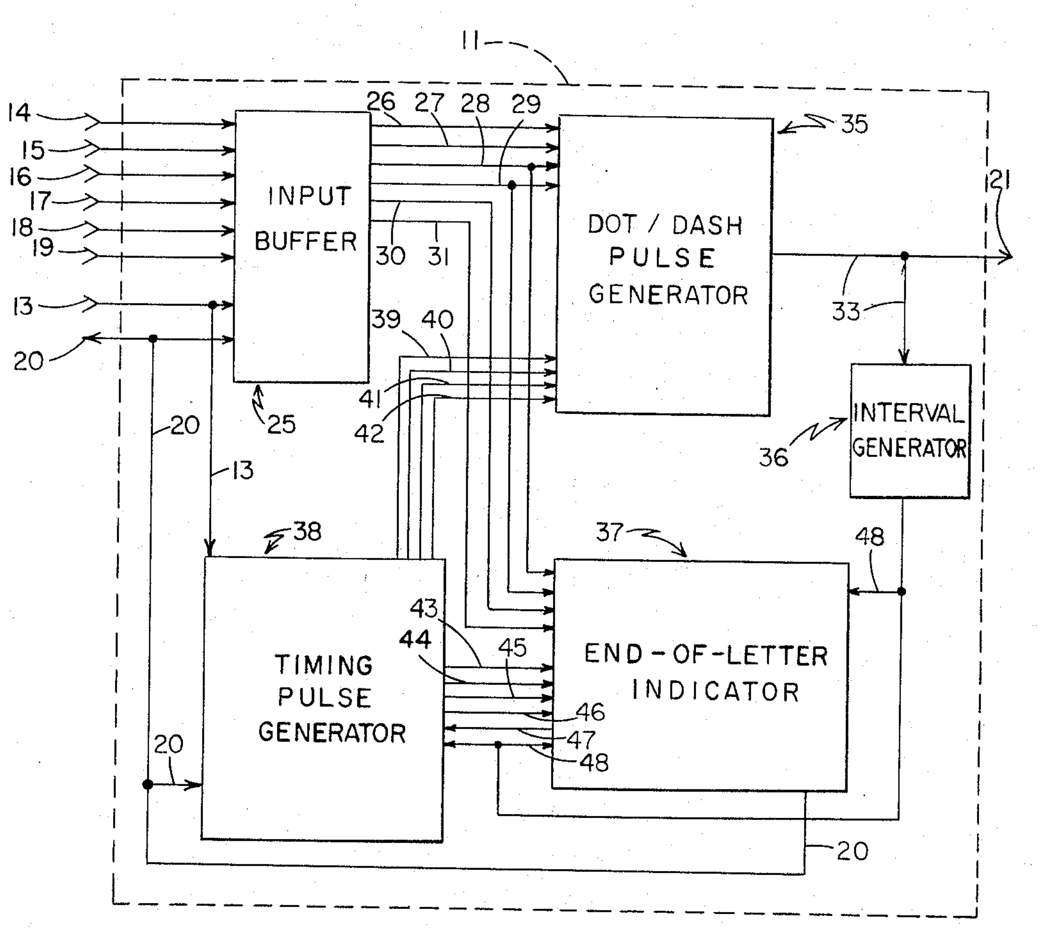
FIG. 3 is a functional block diagram of the code translator of the invention.

Referring now to FIG. 3, the computer 10 transmits the binary data to the input buffer 25 of translator 11 via lines 14 through 19, each line carrying one bit of binary data, and transmits a strobe pulse to the translator on line 13. The strobe pulse activates the input buffer 25 and a timing pulse generator 38. The timing pulse generator generates a first timing level $TL_1$ which is fed to an end-of-letter indicator 37 via line 43, and also generates a timing pulse $T_1$ which is transmitted on line 39 to a dot/dash pulse generator 35. By means of the timing pulse $T_1$, the first information bit $C_1$ is translated to a dot or dash pulse in the dot/dash pulse generator. If $C_1$ is a "0," a dot pulse of one-tenth of a second width is generated, whereas if $C_1$ is a "1," a dash pulse of three-tenths of a second width is generated in the dot/dash pulse generator. The appropriate pulse output 33 of the dot/dash pulse generator is transmitted on line 21 to the audio generator 12 (FIG. 1), thereby triggering the audio generator to produce an audible dot or dash signal. In addition, the pulse output 33 is transmitted to an interval generator 36 which, in effect, produces a time delay of one dot interval, one-tenth of a second, at which time a triggering pulse is transmitted from the interval generator output 48 to the end of letter indicator 37 and the timing pulse generator 38. If there are additional information bits of the letter stored in the input buffer, a second timing level $TL_2$ and a second timing pulse $T_2$ are generated in the timing pulse generator which are transmitted to the end of letter indicator and the dot/dash pulse generator on lines 40 and 44, respectively. The second information bit $C_2$ is then translated to the appropriate dot or dash pulse, with the process being repeated until all information bits are translated. When the last information bit of the letter has been translated, the bigger pulse, appearing at the output terminal 48 of the interval generator 36 activates the end of letter indicator 37, which transmits a signal via line 47 to the timing pulse generator, thereby preventing any further generation of timing levels or pulses. In addition, the end of letter indicator produces a pulse delayed by an additional one-tenth of a second which is transmitted on line 20 to the timing pulse generator, the input buffer and the computer. This pulse clears the input buffer and indicates to the computer that the binary data for the next letter may be sent to the translator.

Figure 4:
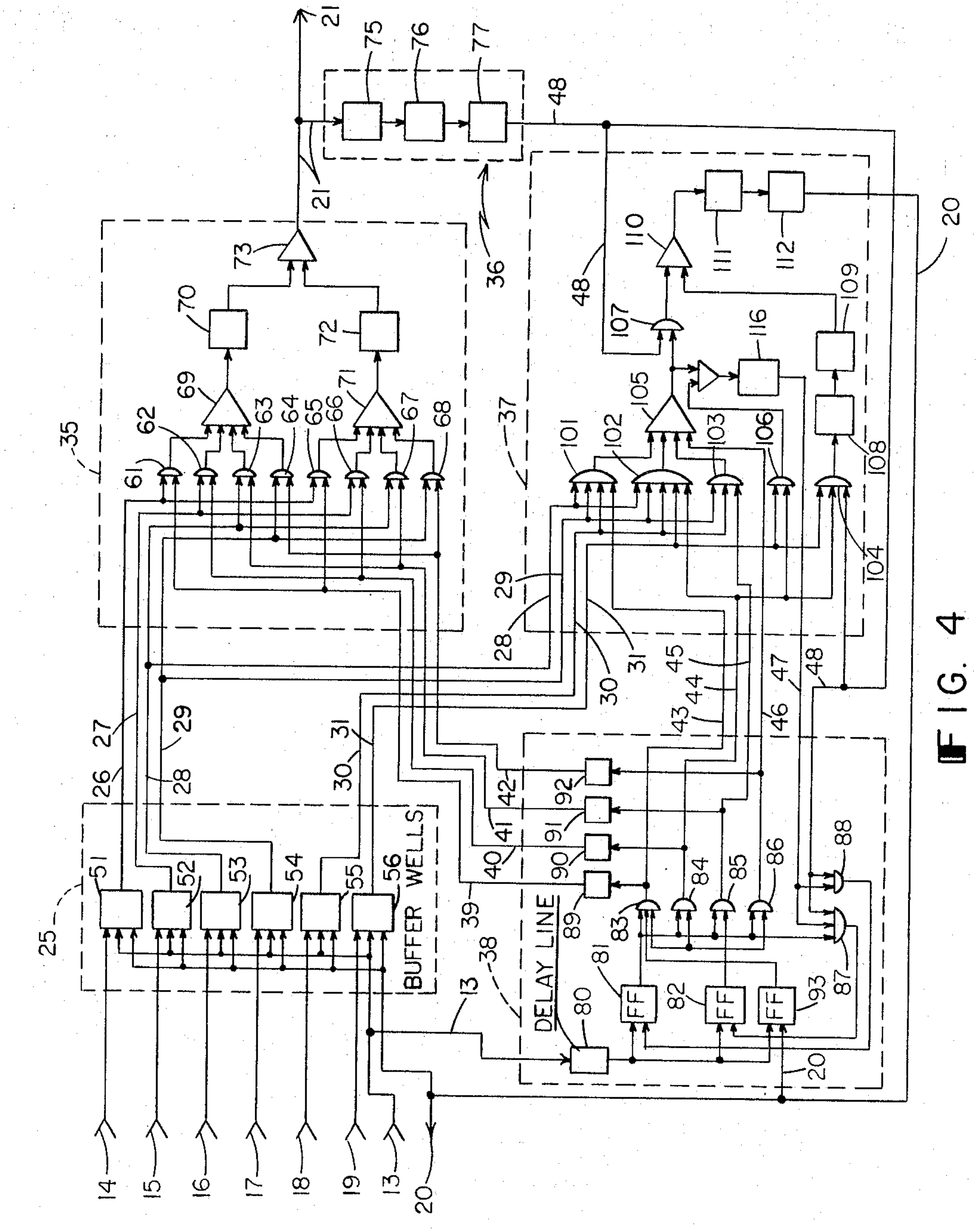
FIG. 4 is a logic representation of one form of the code translator according to the invention.
Figure 5:
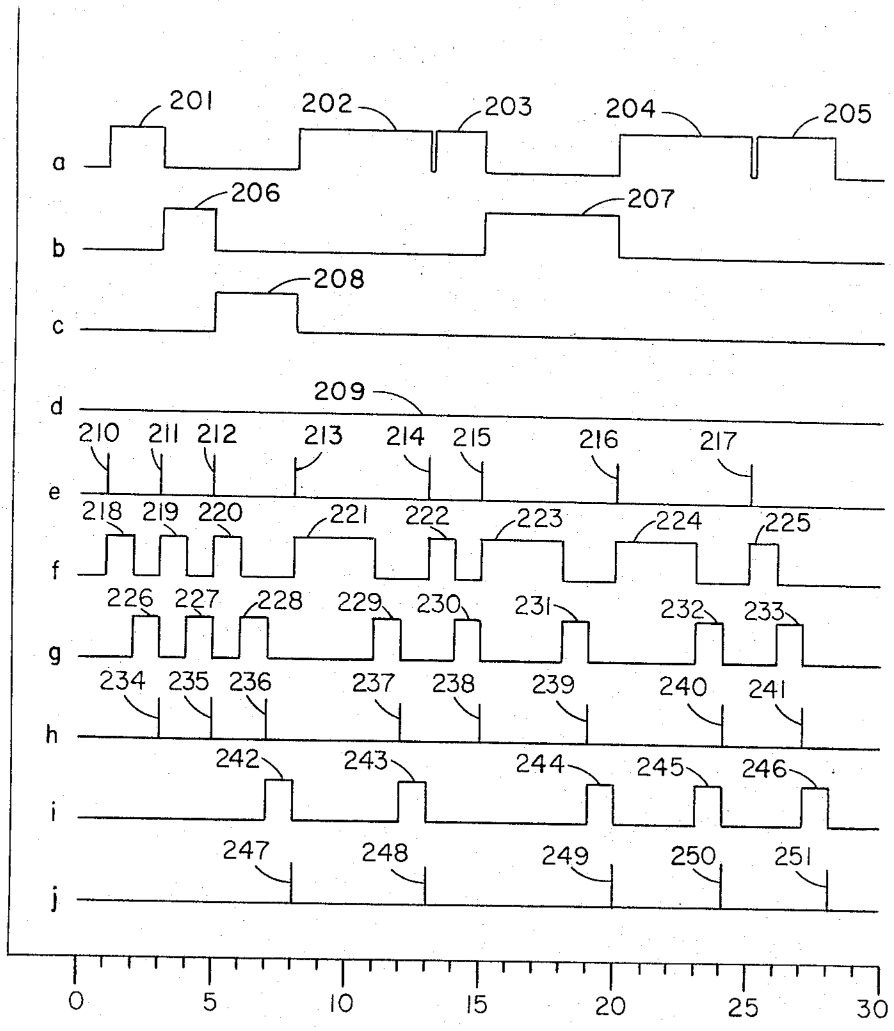
FIG. 5 is a series of waveforms illustrating pulses generated in the translator as a function of time in translating the word "STATE" from binary to Morse code.

Referring now to FIG. 4, the operation of the subsections of the translator will be better understood from the following description:

*Input buffer—25*

The binary data representation of the letter reaches the input buffer via lines 14 through 19, data bit $C_1$ going to buffer well 51, data bit $C_2$ to buffer well 52, data bit $C_3$ to buffer well 53, data bit $C_4$ to buffer well 54, data bit $C_5$ to buffer well 55, and data bit $C_6$ to buffer well 56. The ready strobe pulse from the computer is applied to the input buffer via line 13, being fed in parallel to all six input buffer wells. The binary data is transmitted from the input buffer to the dot/dash pulse generator 35 and the end of letter indicator 37, via lines 26 through 31. Of this data, bits $C_1$ through $C_4$ are fed to the dot/dash pulse generator 35 via lines 26 through 29, and bits $C_3$ through $C_6$ are fed to the end of letter indicator 37 via lines 28 through 31. These lines transmit signal levels equivalent to a "1" or a "0" depending on the individual bits of binary information.

*Timing pulse generator—38*

The ready strobe pulse applied to the input buffer via line 13 is also transmitted to the timing pulse generator 38, where it is first delayed by a delay line 80 and then applied in parallel to three flip-flop circuits 81, 82, and 93, each of which may be in a "1" or a "0" state. The ready strobe pulse resets the flip-flops so that each is in a "0" state. Following the generation of each Morse code character, pulses are transmitted to the timing pulse generator via lines 47 and/or 48, which are applied to AND gates 87 and 88. Under the proper conditions AND gate 87 provides a pulse which is applied to flip-flop 82, thereby complementing the flip-flop and similarly AND gate 88 provides a complementing pulse to flip-flop 81, causing the flip-flops to change from a "0" state to a "1" state, or from a "1" state to a "0" state. In addition, when a pulse is transmitted via line 20 and applied to flip-flop 93, the latter is similarly complemented.

The output of each of flip-flops 81 and 82 is applied to each of four logical AND gates 83, 84, 85 and 86, and the output of flip-flop 93 is applied to AND gate 83. AND gate 83 generates a "1" output when the three flip-flops 81, 82 and 93 are in a "0" state, and generates a "0" output when any of the flip-flops is in a "1" state. AND gate 84 generates a "1" when flip-flop 81 is in a "1" state and flip-flop 82 is in a "0" state. AND gate 85 generates a "1" when flip-flop 81 is in a "0" state and flip-flop 82 is in a "1" state, and AND gate 86 generates a "1" when both flip-flops 81 and 82 are in a "1" state. The output of these AND gates represents the appropriate timing level to control the sequence of the translation to Morse code of the binary information received, a timing level being indicated by a "1." Therefore, timing level $TL_1$ is generated when the output of the AND gate 83 is a "1," timing level $TL_2$ is generated when the output of AND gate 84 is a "1," and so on, with timing $TL_4$ generated when the output of AND gate 86 is a "1." The timing level is transmitted via one of lines 43 through 46 to the end of letter indicator 37, and is simultaneously applied to one of the differentiators 89 through 92, which differentiates the timing level, thereby producing a pulse corresponding in time to the leading edge of the timing level. The output of the differentiator is a timing pulse $T_1$, $T_2$, $T_3$, or $T_4$, which is transmitted to the dot/dash pulse generator 35 via one of lines 39 through 42

*Dot/dash pulse generator—35*

The dot/dash pulse generator 35 receives binary information representing bits $C_1$ through $C_4$ from the input buffer 25 via lines 26 through 29, respectively, and receives timing pulses $T_1$ through $T_4$ from the timing pulse generator 38 via lines 39 through 42, respectively. Each of the above lines is connected in parallel to two of the AND gates 61 through 68; for example, lines 26 and 39 are connected to AND gates 61 and 65, lines 27 and 40 are connected to AND gates 62 and 66, lines 28 and 41 are connected to AND gates 63 and 67, and lines 29 and 42 are connected to AND gates 64 and 68.

Each of AND gates 61 through 68 produces a "1" output pulse when its respective input conditions are met, the conditions being as follows: AND gate 61–$C_1$ is a "0" and $T_1$ is received; AND gate 62–$C_2$ is a "0" and $T_2$ is received; AND gate 63–$C_3$ is a "0" and $T_3$ is received; AND gate 64–$C_4$ is a "0" and $T_4$ is received; AND gate 65–$C_1$ is a "1" and $T_1$ is received; AND gate 66–$C_2$ is a "1" and $T_2$ is received; AND gate 67–$C_3$ is a "1" and $T_3$ is received; and AND gate 68–$C_4$ is a "1" and $T_4$ is received. A "1" generated from AND gate 61, 62, 63 or 64 is applied via OR gate 69 to a one shot dot pulse generator 70, producing a dot pulse which is transmitted via OR gate 73 to output line 21. A "1" generated from AND gate 65, 66, 67 or 68 is applied via OR gate 71 to a one shot dash pulse generator 72, producing a dash pulse which is transmitted via OR gate 73 to the output line 21.

*Interval generator—36*

The purpose of the interval generator 36 is to generate a pulse, hereafter referred to as a TX pulse, which occurs at a time equal to one dot interval after the completion of a dot or dash pulse output from the dot/dash pulse generator 35. To accomplish this, a dot or dash pulse received on line 21 is applied to a differentiator 75 and the output pulse from the differentiator, corresponding to the trailing edge of the input dot or dash pulse, is, in turn, applied to a one shot dot pulse generator 76. The resultant dot pulse output is then applied to a second differentiator 77 and the output pulse, corresponding to the trailing edge of the dot pulse input, is the desired TX pulse, which is transmitted via line 48 to the end of letter indicator 37 and the timing pulse generator 38.

*End of letter indicator—37*

The end of letter indicator 37 performs the function of generating a pulse when the last information bit of a letter has been translated. This pulse is generated through an interrogation of the potential dummy bits $C_3$, $C_4$, $C_5$ and $C_6$ of the binary representation of the letter. These bits are received by the end of letter indicator on lines 28, 29, 30 and 31, and are applied in a logical order to AND gates 101, 102, 103, 104, and 106. In addition, the timing levels $TL_1$ through $TL_4$ are transmitted from the timing pulse generator 38 to the end of letter indicator via lines 43, 44, 45 and 46, respectively, with timing levels $TL_1$, $TL_2$ and $TL_3$ being applied in a corresponding logical order to the above mentioned AND gates. Timing level $TL_4$ is applied directly to OR gate 105. Under the following conditions, the respective AND gate produces a "1" output which is transmitted via OR gate 105 to AND gate 107 and OR gate 115: gate 101–$C_5$ is a "0," $C_4$ is a "0," $C_3$ is a "0" and $TL_1$ is a "1"; gate 102–$C_6$, $C_5$ and $C_4$ are "0," $C_3$ is a "1" and $TL_2$ is a "1"; and, gate 103–$C_5$ is a "0," $C_4$ is a "1" and $TL_3$ is a "1." The pulse output from OR gate 105 is transmitted via OR gate 115 to an inhibit gate 116, producing a signal which is transmitted via line 47 to the timing pulse generator 38 and is applied to AND gates 87 and 88, thereby inhibiting these gates, with the result that no further timing pulses or levels can be generated in the timing pulse generator.

The pulse output from OR gate 105 is also applied to AND gate 107 so that a subsequent TX pulse is passed through AND gate 107 and is applied via OR gate 110 to a one shot dot generator 111. The dot pulse output from the generator is then applied to a differentiator 112. The output pulse from the differentiator, which corresponds in time to the trailing edge of the dot pulse input, is transmitted via line 20 to the timing pulse generator 38, to the input buffer 25 and to the computer 10. This pulse, termed a "ready" pulse, indicates to the computer that the binary representation of the next letter is to be sent to the translator.

In the special case where the letter to be translated is an I preceding the station identification call letters of an instrument landing system radio station, the last bit, $C_6$, of the binary representation of the letter is a "1." Therefore after timing level $TL_2$ goes to a "1," AND gate 106 produces a "1" output, since $C_6$ is a "1," which is applied via OR gate 115 to the inhibit circuit 116, and in the manner as described above, no further timing levels or pulses can be generated in the timing pulse generator. In addition, AND gate 104 is activated so that the TX pulse, generated after the second dot of the letter I, is applied to a one shot generator 108, which generates a pulse having a duration of four units of time. This pulse is applied to a differentiator 109, the output of which corresponds in time to the trailing edge of the input pulse. This output pulse is applied via OR gate 110 to the one shot dot generator 111 and in the manner as described above, a "ready" pulse is generated, which is transmitted via line 20 to the timing pulse generator 38, to the input buffer 25, and to the computer 10.

Figure 6:
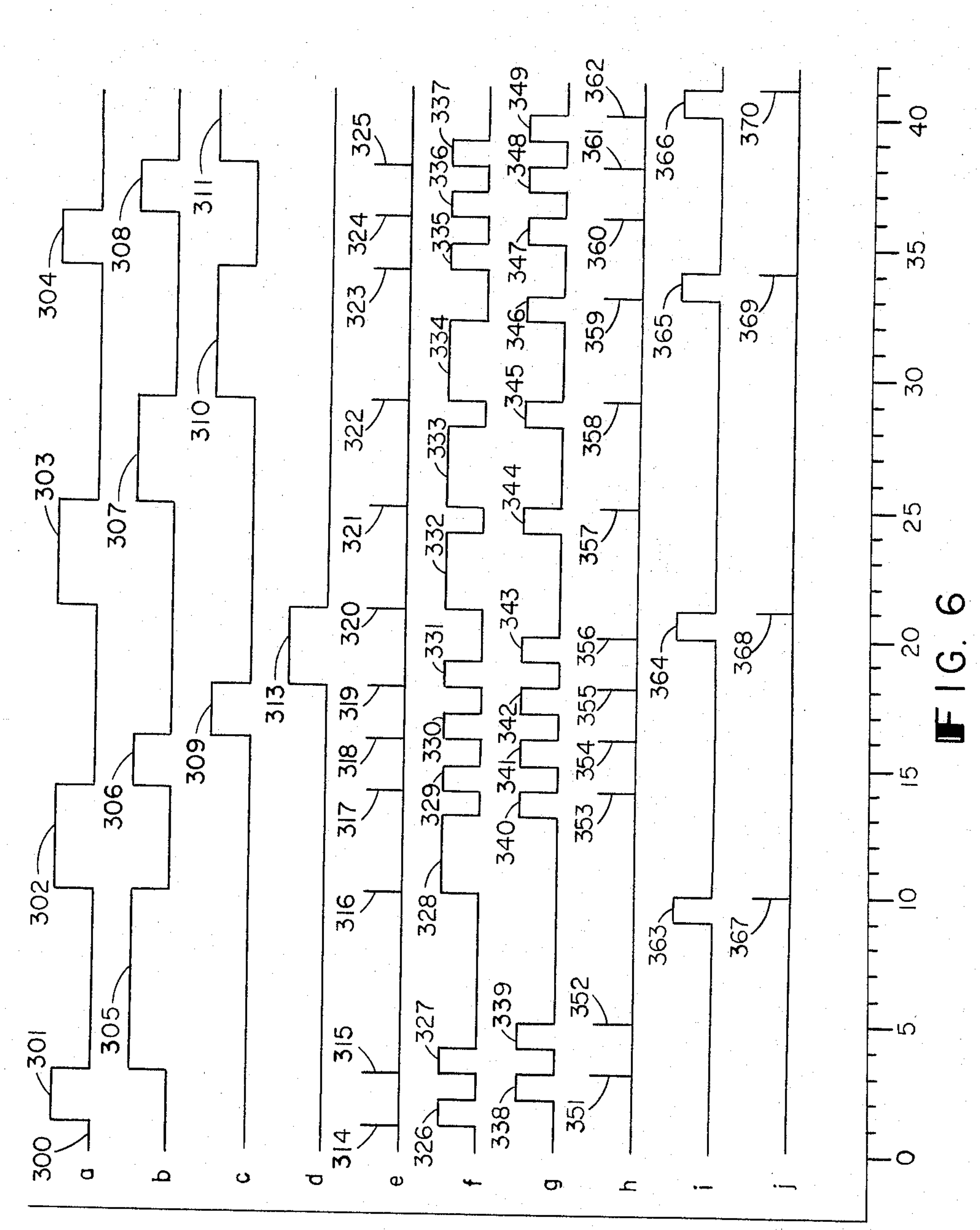
FIG. 6 is a series of waveforms illustrating pulses generated in the translator as a function of time in translating the station identification call letters I BOS from binary to Morse code.
Figure 7A:
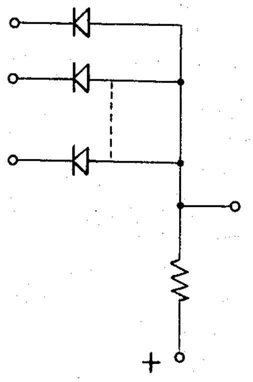
FIGS. 7A, 7B and 7C are circuit diagrams of typical "and," "or," and "one-shot flip-flop" circuits, respectively, which may be used to implement the logic of FIG. 4.
Figure 7B:
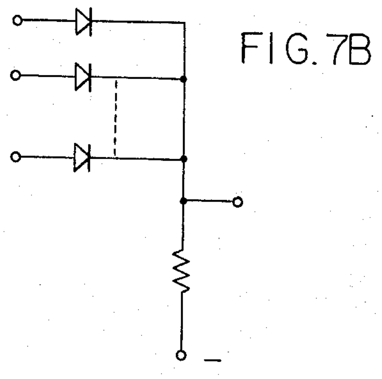
Figure 7C:
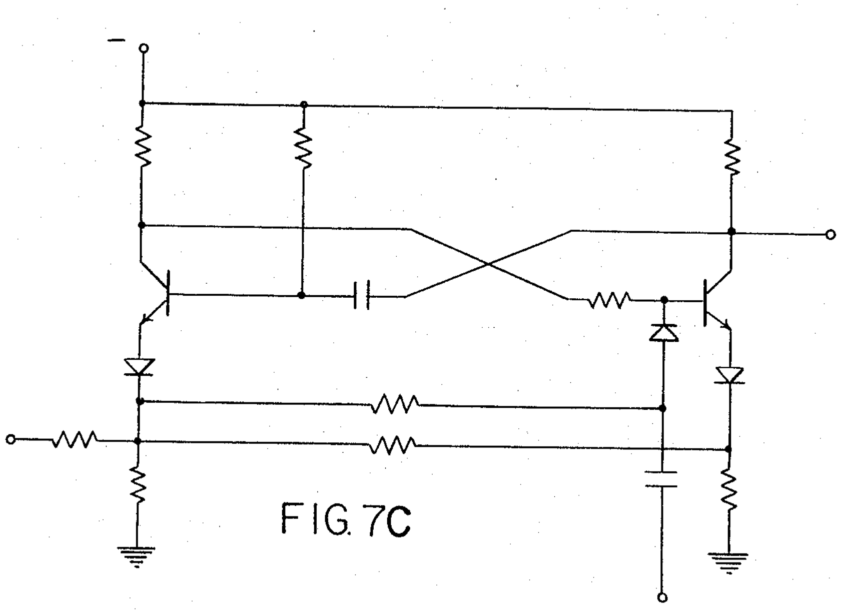

Referring next to FIG. 6, the following detailed description is given of the translation from binary to Morse code of the station-identification call letters I BOS of an Instrument Landing System radio station. The pulses in this figure are represented as a function of time with one unit of time equivalent to a dot interval. Initially, the binary representation of the letter I is sent from the computer to the translator. This is represented as $C_1'C_2'C_3C_4'C_5'C_6$. At one unit of time the ready strobe pulse is sent to the translator. This resets flip-flops 81, 82 and 93 to zero, thereby generating a timing level $TL_1$ 301 from AND gate 83, with the timing level $TL_1$ going to the end of letter indicator and to differentiator 89. $TL_1$ is differentiated producing timing pulse $T_1$ 314 which is transmitted via line 39 to the dot/dash pulse generator. With the condition $T_1C_1'$, AND gate 61 is activated, sending a pulse via OR gate 69 to trigger the one shot dot flip-flop 70, thereby producing a dot pulse 326, which is transmitted via line 21 to key the audio tone generator 12, and in addition is applied to the interval generator 36. In the interval generator the dot pulse 326 is differentiated, with the pulse corresponding in time to the trailing edge of pulse 326 triggering the one shot dot flip-flop 76, thereby generating the dot pulse 328. This pulse is differentiated by differentiator 76, producing a TX pulse 351 corresponding in time to the trailing edge of pulse 338. The TX pulse 351 is sent via lines 48 to the end of letter indicator and the timing pulse generator. Since OR gate 105 remains at a zero level, TX pulse 351 complements flip-flop 81 via AND gate 87. This cause $TL_1$ to go to "0" and by means of AND gate 84, $TL_2$ 305 goes to a "1" level. $TL_2$ is applied to the end of letter indicator via line 44. With the condition $TL_2C_6$, AND gate 106 is activated producing a "1" output which passes through OR gate 115 to the inhibit circuit 116, which prevents the timing pulse generator from generating any further timing levels. Coincidentally, $TL_2$ is sent to the differentiator 90 producing an output timing pulse $T_2$ 315, which is transmitted to the dot/dash pulse generator via line 40. With the condition $T_2C_2'$, AND gate 62 is activated applying a pulse via OR gate 69 to the one shot dot flip-flop 70, which produces a dot output pulse 327. In the same manner as described above, this pulse reaches the audio tone generator and the interval generator, generating a TX pulse 352. The TX pulse is sent to the timing pulse generator and to the end of letter indicator via line 48. Since the complementing AND gates are 87 and 88 inhibited, no further timing levels are generated in the timing pulse generator. TX pulse 352 reaches AND gate 104, and with the condition $TL_2C_6TX$, a pulse is transmitted via AND gate 104 to a one shot flip-flop 108. This flip-flop produces a pulse, having a duration of four units of time, which is applied to the differentiator 109 thereby generating an output pulse corresponding to the trailing edge of the input pulse. This output pulse passes through OR gate 110 and triggers the one shot dot flip-flop 111. The pulse output of flip-flop 111 goes to the differentiator 112, generating an output pulse 367 corresponding to the trailing edge of the input pulse. This pulse is transmitted via line 20 to the timing pulse generator and to the computer, indicating that the translation of the letter I has been completed and that the translator is ready to receive the next letter. As can be seen from the above description there will be a total of six units of time between the last dot of the letter I and the first character of the next letter, with one unit of time of this interval coming from the interval generator 36, four units of time coming from the end of letter indicator by means of flip-flop 108 and differentiator 109 and the last unit of time of the interval coming from the flip-flop 111 and differentiator 112.

Next, the computer sends the binary representation of the letter B, which is equivalent to $C_1C_2'C_3'C_4'C_5C_6'$, to the translator. At the same time a ready strobe pulse is sent to the translator, activating the input buffer circuits, and after a very short delay, resetting the flip-flops 81, 82 and 93 to "0." Therefore, a timing level $TL_1$ 302 is generated via AND gate 83. This timing level $TL_1$ is transmitted to the end of letter indicator on line 43 and goes to the differentiator 89 resulting in an output timing pulse $T_1$ 316, which is transmitted on line 39 to the dot/dash pulse generator. With the condition $T_1C_1$, AND gate 65 is activated, applying a pulse via OR gate 71 to the one shot dash flip-flop 72, which produces a dash pulse interval having a duration of three units of time. The dash pulse 328 is transmitted on line 21 to the audio tone generator and to the interval generator. In the same manner as described above, this pulse is differentiated with a pulse corresponding to the trailing edge of the dash pulse triggering the flip-flop 76, thereby generating an output pulse 340 which is applied to the differentiator 77, producing an output TX pulse 353. The TX pulse is transmitted via line 48 to the end of letter indicator and the timing pulse generator. By means of AND gate 87, flip-flop 81 is complemented, producing a timing level $TL_2$ 306 via AND gate 84. $TL_2$ is sent to the end of letter indicator and to differentiator 90. When $TL_2$ is applied to the differentiator 90, a timing pulse $T_2$ 317 is transmitted to the dot/dash pulse generator via line 40, and with the condition $T_2C_2'$, AND gate 62 is activated, applying a triggering pulse via OR gate 69 to the one shot dot flip-flop 70, thereby producing a dot output pulse 329 which goes through OR gate 73 to the audio tone generator and to the interval generator. As previously described, the interval generator produces a TX pulse 354 which follows the trailing edge of the dot pulse output of the dot/dash pulse generator by one unit of time. The output TX pulse goes to the timing pulse generator, and via AND gates 87 and 88 complements both flip-flops 81 and 82 with the result that a timing level $TL_3$ 309 is generated via AND gate 85. By means of differentiator 91 a timing pulse $T_3$ 318 is generated and transmitted on line 41 to the dot/dash pulse generator. With the condition $T_3C_3'$, AND gate 63 is activated thereby applying a triggering pulse via OR gate 69 to the one shot dot flip-flop 70. The dot output pulse 330 is sent via OR gate 73 to the audio tone generator and to the interval generator. The resultant output of the interval generator 355 is sent to the timing pulse generator, and by means of AND gate 87, flip-flop 81 is complemented, so that timing level $TL_4$ 313 is generated via AND gate 86. This timing level is sent via line 46 to the OR gate 105 in the end of letter indicator and is sent to the differentiator 92, generating an output timing pulse $T_4$ 319, which is sent via line 42 to the dot/dash pulse generator. With the condition $T_4C_4'$, AND gate 64 is activated sending a "1" pulse via OR gate 69 to the one-shot dot flip-flop 70, which generates the dot output pulse 331, which is applied via OR gate 73 and line 21 to the audio tone generator and to the interval generator. Since the output of OR gate 105 is now a "1," this "1" is transmitted via OR gate 115 to the inhibit circuit 116 thus inhibiting any further generation of timing levels or pulses in the timing pulse generator. When the subsequent output TX pulse 356 reaches the end of letter indicator it passes through AND gate 107 and OR gate 110, thereby triggering the one shot dot flip-flop 111 with the resultant output pulse 364 going to differentiator 112. The output pulse 368 from the differentiator corresponds to the trailing edge of the input pulse 364. This output pulse 368 is sent via line 20 to the timing pulse generator, thereby complementing flip-flop 93, and is sent to the computer indicating to the computer that the translator is ready to receive the next letter.

The computer then sends to the input buffer of the translator the binary representation of the letter O which is equivalent to $C_1C_2C_3C_4C_5'C_6'$. In addition, the ready strobe pulse is sent to the translator on line 20, thereby activating the input buffer circuits and after a short delay resets flip-flops 81, 82 and 93 to "0," producing a timing level $TL_1$ 303 via AND gate 83. $TL_1$ is sent to the end of letter indicator on line 43 and also is applied to the differentiator 89, thereby producing an output timing pulse $T_1$ 320 which is transmitted on line 39 to the dot/dash pulse generator. With the condition $T_1C_1$, AND gate 65 is activated sending a "1" pulse through OR gate 71 to trigger the one shot dash flip-flop 72, producing a dash output pulse 332 which is transmitted via OR gate 73 and line 21 to the audio tone generator and the interval generator. In the interval generator the dash pulse 332 is differentiated producing a pulse corresponding in time to the trailing edge of the input pulse 332, thereby triggering flip-flop 76 and producing an output pulse 344 which is fed to the differentiator 77. The output TX pulse 357 from differentiator 77 corresponds in time to the trailing edge of the input pulse 344. The TX pulse is transmitted on line 48 to the end of letter indicator and to the timing pulse generator. By means of AND gate 87, the flip-flop 81 is complemented, producing timing level $TL_2$ 307 which is transmitted to the end of letter indicator on line 44 and also goes to the differentiator 90. The output of the differentiator is timing pulse $T_2$ 321, which is transmitted to the dot/dash pulse generator on line 40, and with the condition $T_2C_2$ AND gate 66 is activated, applying a triggering pulse via OR gate 71 to the one shot dash flip-flop 72, generating a dash pulse 333 which is transmitted via OR gate 73 and line 21 to the audio tone generator and to the interval generator. In the same manner as previously described, the output TX pulse 358 of the interval generator follows the trailing edge of the input dash pulse 333 by one unit of time. Pulse 358 is transmitted via line 48 to the end of letter indicator and to the timing pulse generator. By means of AND gates 87 and 88, flip-flops 81 and 82 are complemented thereby producing a timing level $TL_3$ 310 via AND gate 85. Timing level $TL_3$ goes to differentiator 91 and via line 45 to the end of letter indicator. With the condition $C_4C_5'TL_3$, AND gate 103 is activated generating a "1" pulse which is applied via OR gate 105 to AND gate 107, and via OR gate 115 to the inhibit circuit 116 with the result that the flip-flops in the timing pulse generator are inhibited from producing any further timing levels. The output from differentiator 91 is a timing pulse $T_3$ 322 which is sent on line 41 to the dot/dash pulse generator. With the condition $T_3C_3$, AND gate 67 is activated and a triggering pulse is applied through OR gate 71 to the one-shot dash flip-flop 72, thereby generating an output dash pulse 334, which is transmitted via OR gate 73 and line 21 to the audio tone generator and to the interval generator. The resultant output TX pulse 359 from the interval generator is applied via AND gate 107 and OR gate 110 to the one shot dot flip-flop 111. This generates a dot pulse 365, which is sent through the differentiator 112. The output pulse 369 from the differentiator is transmitted via line 20 to the timing pulse generator, to the input buffer and to the computer, indicating to the computer that the translator is ready to receive the next letter.

The computer next sends the binary representation of the letter S, which is equivalent to $C_1'C_2'C_3'C_4C_5'C_6'$, and the ready strobe pulse to the translator, thereby activating the input buffers and resetting flip-flops 81, 82 and 93 to "0." A timing level $TL_1$ 304 is generated by means of AND gate 83, and this timing level is sent to the end of letter indicator and to differentiator 89. The output of the differentiator is a timing pulse $T_1$ 323 which goes on line 39 to the dot/dash pulse generator. With the condition $T_1C_1$, AND gate 61 is activated and a triggering pulse is applied via OR gate 69 to the one shot dot flip-flop 70, producing a dot output pulse 335, which is sent through OR gate 73 to the audio tone generator and to the interval generator. The resultant output TX pulse 360 from the interval generator is transmitted via line 48 to the end of letter indicator and the timing pulse generator. In the timing pulse generator flip-flop 81 is complemented, thereby generating a timing level $TL_2$ 308, which is sent on line 44 to the end of letter indicator and to the differentiator 90. The output of the differentiator 90 is a timing pulse $T_2$ 324, which goes to the dot/dash pulse generator on line 40, and with the condition $T_2C_2'$ being satisfied, AND gate 62 is activated. This results in a trigger pulse being applied via OR gate 69 to the one shot dot flip-flop 70, producing an output dot pulse 336, which is transmitted via OR gate 73 and line 21 to the audio tone generator and to the interval generator. The resultant TX output pulse 361 from the interval generator passes along line 48 and by means of AND gates 87 and 88 complements flip-flops 81 and 82 in the timing pulse generator. By means of AND gate 85, a timing level $TL_3$ 311 is generated which goes to differentiator 91 and via line 45 to the end of letter indicator. With the condition $C_4C_5'TL_3$, AND gate 103 generates a "1" output, which is applied via OR gate 105 to the AND gate 107, and via OR gate 115 to the inhibit circuit 116. The timing pulse generator is thus inhibited from generating any further timing levels. The output of the differentiator 91 is a timing pulse $T_3$ which goes on line 41 to the dot/dash pulse generator, and with the condition $T_3C_3$ AND gate 63 is activated producing a triggering pulse which is applied via OR gate 69 to the one shot dot flip-flop 70. The resultant dot output pulse 337 passes via OR gate 73 to line 21, and then to the audio tone generator and the interval generator. The resultant TX output pulse 362 from the interval generator passes to the end of letter indicator and via AND gate 107 and OR gate 110 is applied to the one shot dot flip-flop 111, producing a dot pulse 366 which is applied to the differentiator 112. The output from the differentiator 112 is a pulse 370 which is sent on line 20 to the timing pulse generator, to the input buffer and to the computer, indicating to the computer that the translator is ready to receive the next letter.

This completes the translation of the station identification call letters I–BOS from binary to Morse code. From the foregoing description it is readily obvious, to anyone skilled in the art, how any other word, letter or phrase is similarly translated. It is additionally obvious that the translator is somewhat simplified if no requirement is made to translate a letter I preceding the station identification call letters of an instrument landing system radio station. Without this requirement the following parts may be deleted from the translator shown in FIG. 4: storage means 56 of input buffer 25; line 31; AND gates 104 and 106; interval generator 108; differentiator 109; and, OR gates 115 and 110. In this case the output of OR gate 105 is connected directly to inhibit gate 116, and the output of AND gate 107 is connected directly to the one shot dot pulse generator 111.

Although the preferred embodiment has been shown with the translator being used in conjunction with a computer and with an audio tone generator it is not intended to be limited to this particular configuration. It is obvious that the translator may receive the binary representation of a letter from any device which is capable of storing and reading out such binary information. It is also evident that the output pulses from the translator may be used to trigger a light indicator or any other similar device, in addition to its capabilities of triggering an audio tone translator. It will be understood that various omissions and substitutions and different applications may be made by those skilled in the art without departing from the spirit of the invention. It is applicants' intention, therefore to be limited only as indicated by the scope of the appended claims.

What is claimed is:

1. Apparatus for translating the binary equivalent representation of a character to a dot/dash signal code representation of said character, wherein said binary equivalent representation of said character consists of *m* binary bits of which *n* bits (*n* being less than *m*) are to be translated to said signal code representation, said apparatus comprising:
   - a plurality of input terminals to which input signals are applied;
   - an *m*-bit input buffer connected to said multiplicity of input terminals;
   - means for generating timing pulses;
   - means for sequentially generating dot and dash signals representing said character;
   - means connecting said timing pulse means to said signal code generating means;
   - means for generating time intervals between successive signals generated;
   - means connecting said signal code generating means to said time interval generating means;
   - means connecting said timing pulse means to said time interval generating means;
   - means for interrogating said *m*-binary bits of said binary equivalent representation of said character to determine when said *n* bits have been translated;
   - means connecting said interrogating means to said input buffer and to said timing pulse generating means;
   - and, means operative in response to completion of the translation of said character for generating a signal indicating completion.

2. Apparatus for translating a binary representation of a character to a Morse code representation of said character, wherein said binary representation of said character consists of *m* binary bits of which *n* bits (*n* being 1, 2, 3, or 4 and less than *m*) are to be translated to said Morse code representation of said character, said apparatus comprising:
   - a plurality of input terminals adapted to be connected to a suitable source of input signals;
   - an *m*-bit input buffer connected to said plurality of input terminals;
   - means for generating timing pulses;
   - means for generating Morse code dot and dash signals;

means connecting said timing pulse generating means to one of said plurality of input terminals;
means connecting said Morse code dot and dash signal generating means to said timing pulse generating means;
means for generating a suitable time interval between successive generated Morse code signals;
means connecting said time interval generating means to said Morse code dot and dash signal generating means;
means connecting said timing pulse generating means to said time interval generating means;
means for interrogating said *m* binary bits of said binary representation of said character to determine when said *n* binary bits have been translated;
means connecting said interrogating means to said input buffer and to said timing pulse generating means;
and, means operative in response to the completion of the translation of said character for generating a signal indicating completion.

3. Apparatus according to claim 2 further including means operative to recognize the letter I preceding the station identification call letters of an Instrument Landing System radio station, and means operative to generate a time interval between the translation of the said letter I and the first letter of said station identification call letters.

4. A binary to Morse code translator comprising:
a plurality of input terminals adapted to be connected to a suitable source of input signals;
an input buffer having a plurality of input and output terminals;
means connecting said input buffer to said plurality of input terminals;
a dot/dash pulse generator;
a timing pulse generator having a plurality of output terminals;
means connecting output terminals of said input buffer to said dot/dash pulse generator;
means connecting output terminals of said timing pulse generator to said dot/dash pulse generator;
means connecting one of said input terminals to said timing pulse generator;
an end-of-letter indicator;
an interval generator;
means for connecting selected output terminals of said input buffer to said end-of-letter indicator;
means connecting the output terminals of said timing pulse generator to said end-of-letter indicator;
means connecting the output of said dot/dash pulse generator to said interval generator;
means connecting the output of said interval generator to said end-of-letter indicator and to said timing pulse generator;
a first output terminal;
means connecting the output of said dot/dash pulse generator to said end-of-letter indicator and to the said input buffer;
a second output terminal; and,
means connecting the output of said end-of-letter indicator to said second output terminal.

5. The invention according to claim 4 wherein said input buffer comprises:
a multiplicity of storage bits;
a first multiplicity of input terminals equal in number to said multiplicity of storage bits;
means connecting in one-to-one correspondence said multiplicity of input terminals to said multiplicity of storage bits;
a first additional input terminal;
said first additional input terminal being connected in parallel to each of said storage bits;
a second additional input terminal;
means connecting said second additional input terminal in parallel to each of said storage bits; and, a multiplicity of output terminals equal in number to said multiplicity of storage bits.

6. The invention according to claim 4 wherein said dot/dash pulse generator comprises:
a first plurality of input terminals;
a second plurality of input terminals equal in number to said first plurality;
a plurality of logical AND gates equal in number to the total number of input terminals, each of said AND gates having two input connections and a single output connection;
means connecting said first plurality of input terminals in parallel to two of said plurality of AND gates arranged such that each of said AND gates has one and only one of its input connections connected to any one input terminal;
means for connecting said second plurality of input terminals to each of two AND gate input terminals arranged such that each of said AND gate input terminals is connected to one and only one of said second plurality of input terminals;
first and second OR gates each having a plurality of input connections equal in number to one half of the total number of said AND gates, and having a single output terminal;
means connecting the outputs of half of said AND gates to the input connections of said first OR gate;
means connecting the outputs of the remaining half of said AND gates to the input connections of said second OR gate;
a dot pulse generator having input and output connections;
means connecting the output of said first OR gate to the input of said dot pulse generator;
a dash pulse generator having input and output connections;
means connecting the output of said second OR gate to the input connections of said dash pulse generator;
a third OR gate having two input connections and one output connection;
means connecting the outputs of said dot pulse generator and said dash pulse generator to the first and second input connections, respectively, of said third OR gate;
an output terminal; and
means connecting the output connection of said third OR gate to said output terminal.

7. The invention according to claim 4 wherein said interval generator comprises:
an input terminal;
a first and a second differentiator each having input and output connections;
means connecting said input terminal to the input connection of said first differentiator;
a dot pulse generator having input and output connections;
means connecting the output connection of said first differentiator to the input connection of said dot pulse generator;
means connecting the output connection of said dot pulse generator to the input connection of said second differentiator;
an output terminal; and,
means connecting the output connection of said second differentiator to said output terminal.

8. The invention according to claim 4 wherein said timing pulse generator comprises:
first, second, third and fourth input terminals;
first, second and third flip-flops, each having first and second input connections and a single output connection;
a delay line having input and output terminals;
means connecting the input terminal of said delay line to said first input terminal and the output terminal of said delay line to each of said first, second and third flip-flops;

means connecting said second input terminal to an input connection of said third flip-flop;

first and second AND gates, having two and three input connections, respectively, and each having two output connections;

means connecting one output connection of said first AND gate to an input terminal of said first flip-flop;

means connecting an output connection of said second AND gate to an input connection of said second flip-flop;

means connecting said third input terminal in parallel to an input connection of each of said first and second AND gates;

means connecting said fourth input terminal to an input terminal of each of said first and second AND gates;

third, fourth, fifth, and sixth AND gates, said third AND gate having three input connections and one output connection and each of said fourth, fifth and sixth AND gates having two input connections and one output connection;

means connecting the output connection of said first flip-flop in parallel to an input connection of each of said second, third, fourth, fifth and sixth AND gates;

means connecting the output connection of said second flip-flop to an input connection of each of said third, fourth, fifth, and sixth AND gates;

means connecting the output connection of said third flip-flop to an input connection of said third AND gate;

first, second, third and fourth differentiators each having input and output connections;

means respectively connecting the output connections of said third, fourth, fifth and sixth AND gates to the input connections of said first, second, third and fourth differentiators;

first, second, third and fourth output terminals;

means respectively connecting the output connections of said first, second, third and fourth differentiators to said first, second, third and fourth output terminals;

fifth, sixth, seventh and eighth output terminals; and means respectively connecting the output connections of said third, fourth, fifth and sixth AND gates to said fifth, sixth, seventh and eighth output terminals.

9. The invention according to claim 4 wherein said end-of-letter indicator comprises:

first, second, third, fourth, fifth, sixth, seventh, eighth, ninth and tenth input terminals;

first, second, third, fourth, fifth and sixth AND gates each having a single output connection, said second AND gate having five input connections, said first AND gate having four input connections, said third and fifth AND gates having three input connections, and said fourth and sixth AND gates having two input connections;

means connecting an input connection of each of said first and second AND gates to said first input terminal;

means connecting an input connection of said first, second and third AND gates to said second input terminal;

means connecting an input connection of said first, second and third AND gates to said third input terminal;

means connecting an input connection of each of said second, fifth and sixth AND gates to said fourth input terminal;

means connecting an input terminal of said first AND gate to said fifth input terminal;

means connecting an input connection of each of said second, fourth, and fifth AND gates to said sixth input terminal;

means connecting an input connection of said third AND gate to said seventh input terminal;

means connecting an input connection of said fifth AND gate to said ninth input terminal;

means connecting an input connection of said sixth AND gate to said tenth input terminal;

a first OR gate having four input connections and one output connection;

second and third OR gates each having two input connections and a single output connection;

means connecting the output connections of said first, second and third AND gates to input connections of said first OR gate;

means connecting an input connection of said first OR gate to said eighth input terminal;

means connecting the output connection of said first OR gate to an input connection of said second OR gate and to an input connection of said sixth AND gate;

means connecting the output connection of said fourth AND gate to an input connection of said second OR gate;

an inhibit circuit having an input connection and an output connection;

means connecting the output connection of said second OR gate to the input connection of said inhibit circuit;

a first output terminal;

means connecting the output connection of said inhibit circuit to said first output terminal;

a pulse generator having input and output connections;

first and second differentiators, each having an input connection and an output connection;

means connecting the output connection of said fifth AND gate to the input connection of said pulse generator;

means connecting the output of said pulse generator to the input connection of said first differentiator;

means connecting the output connection of said first differentiator to an input connection of said third OR gate;

a dot pulse generator having input and output connections;

means connecting the output connection of said third OR gate to the input connection of said dot pulse generator;

means connecting the output connection of said dot pulse generator to the input connection of said second differentiator;

a second output terminal; and, means connecting the output connection of said second differentiator to said second output terminal.

References Cited by the Examiner

UNITED STATES PATENTS 3,213,195 10/1965 Gryk ______________ 340—347

MAYNARD R. WILBUR, *Primary Examiner.*

W. J. KOPACZ, *Assistant Examiner.*